United States Patent [19]

Schwarzenbach

[11] 4,392,354
[45] Jul. 12, 1983

[54] CONSTANT PRESSURE AIR STORAGE INSTALLATION WITH WATER SUPPLY FOR GAS TURBINE POWER PLANTS

[75] Inventor: Alfred Schwarzenbach, Wettingen, Switzerland

[73] Assignee: BBC Brown, Boveri & Company Limited, Baden, Switzerland

[21] Appl. No.: 193,097

[22] Filed: Oct. 2, 1980

[30] Foreign Application Priority Data

Dec. 5, 1979 [CH] Switzerland .................. 10786/79

[51] Int. Cl.³ .................................................. F02C 9/14
[52] U.S. Cl. .................................... 60/727; 60/659; 405/54; 405/59
[58] Field of Search .............. 60/39.02, 727, 659; 405/54, 59

[56] References Cited

U.S. PATENT DOCUMENTS

| | | | |
|---|---|---|---|
| 2,947,147 | 8/1960 | Johnson | 405/54 |
| 3,643,426 | 2/1972 | Janelid | 405/59 X |
| 3,895,493 | 7/1975 | Rigollot | 60/659 |
| 3,988,897 | 11/1976 | Strub | 60/659 X |
| 4,147,204 | 4/1979 | Pfenninger | 60/659 X |
| 4,150,547 | 4/1979 | Hobson | 60/659 |

Primary Examiner—Gerald A. Michalsky
Attorney, Agent, or Firm—Werner W. Kleeman

[57] ABSTRACT

A constant pressure air storage supply for gas turbine power plants which comprises a cavern and a water supply. In order to prevent the blowing-out of the cavern water through the riser tube there is provided within such riser tube a servomotor-operated regulation valve. This valve, upon occurrence of a certain pressure drop within the cavern, which signals the blow-out danger, is controlled by a pulse transmitter and throttles to the requisite degree the outflow from the cavern.

2 Claims, 1 Drawing Figure

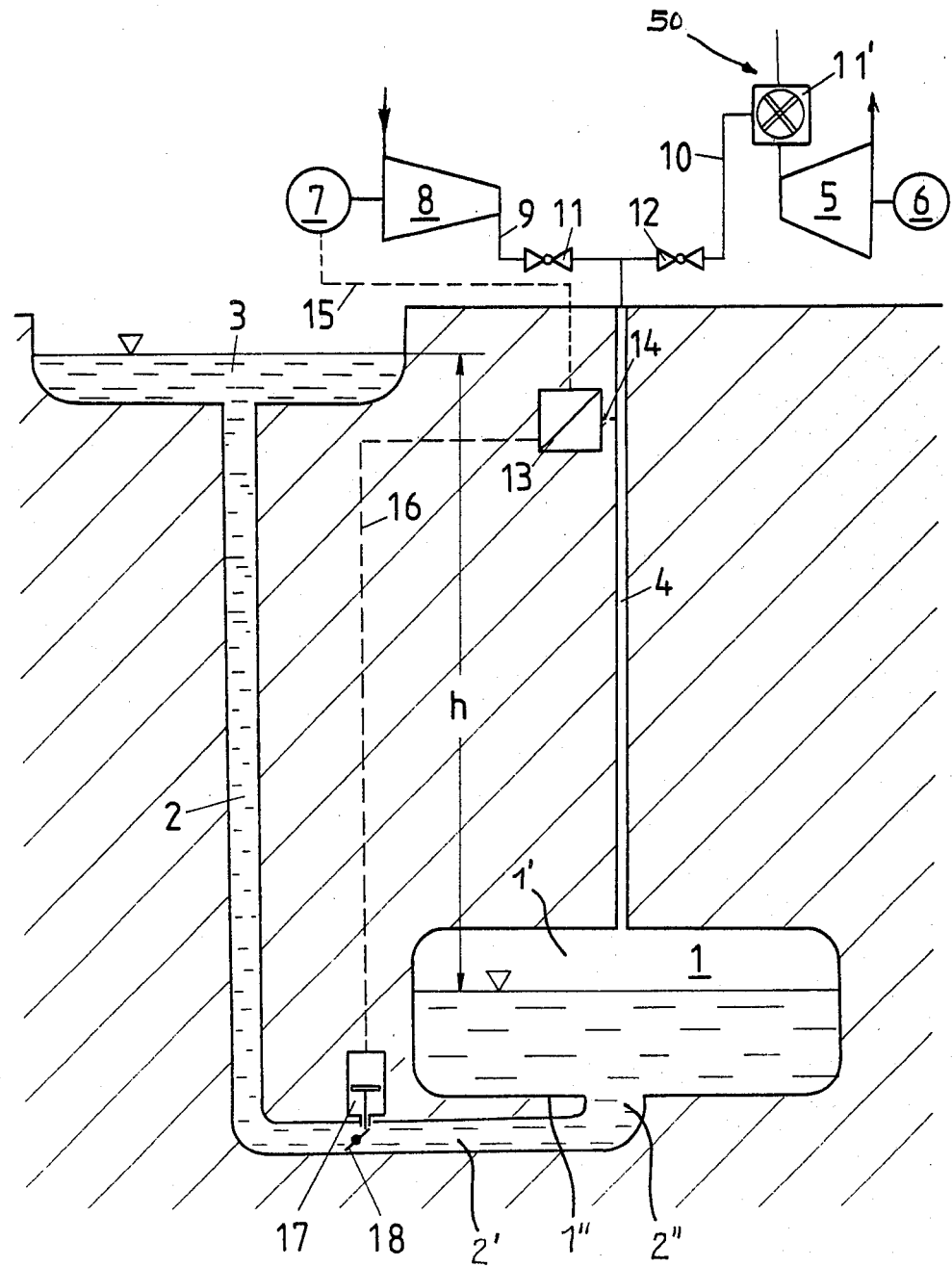

CONSTANT PRESSURE AIR STORAGE INSTALLATION WITH WATER SUPPLY FOR GAS TURBINE POWER PLANTS

CROSS REFERENCE TO RELATED APPLICATIONS

This application is related to the commonly assigned, copending United States application Ser. No. 06/193,098, filed Oct. 2, 1980, entitled: "CONSTANT PRESSURE STORAGE INSTALLATION WITH WATER SUPPLY FOR GAS TURBINE POWER PLANTS" now U.S. Pat. No. 4,355,923, granted Oct. 26, 1982. This application is also related to the commonly assigned, copending United States application Ser. No. 06/192,375, filed Sept. 30, 1980, and entitled "Apparatus For Preventing Blowing Out Of the Water Supply Of Constant Pressure Air Storage Installations Of Gas Turbine Power Plants", now U.S. Pat. No. 4,343,369, granted Aug. 10, 1982.

BACKGROUND OF THE INVENTION

The present invention relates to a new and improved construction of a constant pressure air storage installation with water supply for a gas turbine power plant.

Generally speaking, the constant pressure air storage installation for gas turbine power plants as contemplated by the invention is of the type wherein an air compressor can be driven independently of the gas turbine by an electric motor. Further, there is provided an underground cavern for storage of the compressed air and with connection lines extending between the cavern and the compressor and the gas turbine, respectively. Also, there is provided an equalization basin and a riser tube connecting the same with the cavern.

Constant pressure air storage installations for gas turbine power plants require, in relation to air storage installations of the same efficiency or output and working with variable air pressure, which can fluctuate during operation between certain boundaries, only approximately one-third of the volume of the latter. Hence, they are less complicated in their construction and the erection costs of a cavern for constant pressure air storages are appreciably less than in the case of caverns working with variable air pressure.

In order to maintain constant the air pressure of constant pressure storages there is used a water supply which compensates for the air volume which is consumed within the cavern. The water supply contains a water column which opens into a free basin located at ground level and whose static pressure gradient corresponds to the pressure which is to be maintained in the subterrainean cavern. During charging of the cavern, which with present day installations is located at a depth in the order of about 600 to 800 meters, corresponding to a static pressure of the water column of 60 to 80 bar, the water is forced up into the basin, and during discharge the water runs out of the basin into the cavern in order to ensure for the same pressure.

During the operation of air storage gas turbine installations it has been found that during the charging of the caverns the water column ascending in the water supply releases air which has dissolved within the water column. Hence, air bubbles are formed whose volume rapidly upwardly increases. These air bubbles cause a density reduction in the water column, and thus, a pressure drop in the cavern. In the extreme case the water column could be blownout by the compressed air cushion, and hence, the cavern could therefore become completely emptied.

In contrast to the normal speed of dissolution of air within static water, the complete saturation of the water with air occurs more rapidly within the cavern owing to the pronounced turbulence of the water during the charging and discharging operations, since now all of the water particles soon come into contact with the air. The quantity by weight of air which is taken-up by the water is proportional to the pressure, which, as stated, with the heretofore known installations, is in the order of between 60 and 80 bar. As to the thus dissolved quantity of air the following comparison is of interest:

At 1 bar air pressure and 10° C. temperature 1 m$^3$ water ($=1,000$ kg) contains 29.2 grams of air.

At 60 bar pressure and 10° C. temperature 1 m$^3$ water contains 1.7 kg air, in other words approximately 58 times the quantity by weight. At atmospheric pressure such 1.7 kg air corresponds to about 1.32 m$^3$. A water-air mixture which has expanded from 60 bar pressure to atmospheric pressure therefore contains more air than water.

If water which has been saturated with air in this manner ascends upwardly out of the cavern, then by virtue of the descreasing hydrostatic pressure the air is released and forms increasingly greater bubbles. The average density of the water column therefore becomes increasingly smaller and the pressure within the cavern correspondingly drops. If there are not undertaken appropriate measures this can lead to blow-out of the compressed air cushion along with the water column.

A heretofore known measure for preventing this blowing-out phenomenon resides in extending the riser tube containing the water column downwardly in a U-shaped arc or configuration below the base or bottom of the cavern. The lowest point of the riser tube therefore must be located approximately 0.15 h below the relevant water level within the cavern, wherein h constitutes the effective pressure gradient, i.e., the difference between the geodatic height of the upper water level in the compensation or equalization basin and the cavern water level.

With the value of h=600 meters this would mean that the already 600 meters long riser tube must be extended downwardly at least another 90 metres, and specifically, twice this value for the down and up branches, something constituting an impermissibly great increase in the construction expenditure.

SUMMARY OF THE INVENTION

Therefore with the foregoing in mind it is a primary object of the present invention to overcome the aforementioned drawbacks and limitations of the prior art.

Another and more specific object of the present invention aims at providing a new and improved construction of a constant pressure air storage installation with water supply for gas turbine power plants which is not afflicted with the aforementioned drawbacks and shortcomings of the prior art proposals, and additionally, results in a more economical construction of the installation.

Now in order to implement these and still further objects of the invention, which will become more readily apparent as the description proceeds, the constant pressure storage installation of the present development is manifested by the features that means are provided for regulating the throughflow resistance within the riser tube against unintentional outflow of water from the cavern in dependency upon the course as a function of time of a pressure drop arising within the cavern.

BRIEF DESCRIPTION OF THE DRAWING

The invention will be better understood and objects other than those set forth above will become more readily apparent as the description proceeds. Such description makes reference to the annexed drawing wherein the single FIGURE schematically illustrates a constant pressure air storage installation with water supply for a gas turbine power plant according to the invention.

DETAILED DESCRIPTION OF THE PREFERRED EMBODIMENTS

Describing now the drawing, with the schematically illustrated constant pressure air storage installation there is located at the base or bottom 1" of a cavern the mouth 2" of a riser tube or pipe 2 or equivalent structure, whose upper pressure-generating portion having the height h between the water level of the cavern 1 and a compensation or balancing basin 3 or the like is vertically arranged. The riser tube or pipe 2 continues downwardly into a substantially U-shaped channel 2' which forms the aforementioned tube mouth 2" leading to the base or bottom 1" of the cavern 1. In order to avoid any blow-out of the water column, and thus, the air within the cavern 1 due to the previously described pressure gradient reduction of the water column, as likewise explained at the outset of this disclosure, the U-shaped channel 2', without resorting to the inventive measures, would have to extend downwardly by 0.15 h below the lowest operationally permissible cavern water level. This would be associated with an appreciable increase in the costs of the installation.

Leading out of the air space or chamber 1' of the cavern 1 is an air supply and removal line or pipe 4 to a gas turbine installation, generally indicated by reference character 50, which has been installed above ground level. As to such gas turbine installation 50, there has been shown in the drawing as a matter of convenience in illustration, the primary parts or components thereof, and specifically, a gas turbine 5 for driving an electrogenerator 6, an air compressor 8 which can be driven by an electromotor 7, the corresponding air infeed lines 9 and 10 extending between the line or pipe 4 and the compressor 8 and the combustion chamber 11', respectively, and the related switching or change-over valves 11 and 12, respectively.

The invention exploits the concept that an incipient blowing-out during charging of the cavern 1 by the air compressor 8 is noticable because of a rapid pressure drop, in other words, a negative pressure gradient, within the cavern 1. Hence, there can be used the negative pressure gradient within the cavern 1, during which the danger exists of the blowing-out of water, for triggering a measure by means of which there can be braked or completely suppressed the outflow of cavern water into the riser tube 2. For this purpose there is provided at the upper part of the installation a pulse transmitter 13 which is connected by means of a measuring line 14 with the air line or conduit 4. The pulse transmitter 13 is connected by means of a pulse transmission line 15 with the electromotor 7 and by means of a second pulse transmission line 16 with a servomotor 17 for actuation of a regulation valve 18, such as a standard flap valve, which is mounted at the lower horizontal portion 2' of the riser tube 2.

The pulse transmitter 13 has two switching functions: if there is reported to the pulse transmitter 13 during a charging period, by means of the measuring line 14, a pressure drop, i.e. a negative pressure gradient, then the pulse transmitter 13 transmits by means of the pulse line 16 a closing signal to the servomotor 17, which rotates the regulation valve 18, which up to then was in a completely open position, i.e. horizontal position, into a partially or completely closed position, depending upon the intensity of the pressure gradient reported to the pulse transmitter 13 by the measuring line 14. In this way there is throttled or in the extreme case completely suppressed the medium outflow from the cavern 1. At the same time the drive motor 7 has infed thereto, by means of the second pulse transmission line 15, a cut-off signal and such drive motor 7 is then turned-off. With the aid of this device it is therefore possible to temporarily maintain a higher pressure in the cavern 1, by throttling or shutting-off the compensation or balancing flow within the riser tube 2, than the pressure within the riser tube or pipe 2, and thus, to prevent the blowing-out phenomenon.

By means of an electronic program control which is arranged in circuit following the pulse transmitter 13 it is possible to accommodate the pulse sequence and the switching sequence for the electric motor 7 and the servomotor 17 and the temporal course of the throttling action in the riser tube or pipe 2 to the operating conditions of the gas turbine power plant and by appropriately programing the control there can be realized a desired course of the operation.

While there are shown and described present preferred embodiments of the invention, the invention is not limited thereto, but may be otherwise variously embodied and practiced within the scope of the following claims. Accordingly,

What I claim is:

1. A constant pressure air storage installation having a water supply for gas turbine power plants containing a gas turbine, comprising:
    a subterranean cavern;
    an air compressor;
    an electric motor for driving the air compressor independently of the gas turbine;
    said subterranean cavern serving for the storage of compressed air delivered by the air compressor;
    connection lines extending between the cavern and the air compressor and the gas turbine;
    a compensation basin;
    a riser tube connecting the compensation basin with the cavern; and
    means for regulating the throughflow resistance within the riser tube in dependency upon a course as function of time of a pressure drop arising within the cavern, in order to safeguard against unintentional outflow of water out of the cavern and through the riser tube, to thereby prevent blow-out of water from the cavern due to the action of the compressed air in the cavern.

2. The constant pressure air storage installation as defined in claim 1, wherein:
    said means for regulating the throughflow resistance comprises:
    a pulse transmitter;
    a measuring line for measuring the cavern pressure and acting upon said pulse transmitter;

a regulation valve arranged in the riser tube;

a servomotor for actuating the regulation valve;

pulse transmission line means arranged between said pulse transmitter and said electric motor driving the air compressor and between said pulse transmitter and said servomotor which actuates the regulation valve; and said pulse transmission line means serving for transmitting triggering pulses from the pulse transmitter for acting upon the electric motor driving the air compressor and the servomotor actuating the regulation valve.

* * * * *